Oct. 5, 1965 R. GOUTTEBEL 3,210,744
SENSING DEVICE FOR MAGNETIC CORE MEMORIES
Filed April 24, 1962 5 Sheets-Sheet 1

Oct. 5, 1965 R. GOUTTEBEL 3,210,744

SENSING DEVICE FOR MAGNETIC CORE MEMORIES

Filed April 24, 1962 5 Sheets-Sheet 4

United States Patent Office 3,210,744
Patented Oct. 5, 1965

3,210,744

SENSING DEVICE FOR MAGNETIC CORE MEMORIES

Raymond Gouttebel, Clamart, France, assignor to Automatic Electric Laboratories, Inc., Northlake, Ill., a corporation of Delaware Filed Apr. 24, 1962, Ser. No. 189,779
Claims priority, application France, Apr. 28, 1961, 860,228
12 Claims. (Cl. 340—174)

The present invention relates to a device for reading memories employing magnetic cores having a rectangular hysteresis cycle, and more particularly to a device for reading without erasure of the information and consequently without the need for reinscription, or more precisely, a device for reading and then reinscribing automatically.

According to the invention, the reading and reinscription device for a magnetic core memory involves at least one magnetic core having a rectangular hysteresis cycle, a sense winding and an interrogation winding around the said core, and a circuit associated with the said interrogation winding which includes, in addition to the said winding, a source of direct current, a resistance, a capacitor, and means for short circuiting the interrogation winding and the capacitor.

When the capacitor and the interrogation winding are not short circuited, that is, during the charging of the capacitor, the charging current causes the core to switch from a first stable state to a second, and the binary digit "one" is reinscribed in the core. When the condenser and the interrogation winding are short circuited, that is to say, during the discharge of the capacitor, the discharge current causes the core to switch from the second stable state to the first, the resulting variation of remanent induction and flux induces a current in the sense winding, and the binary digit "one" stored in the core is read.

In the case of a magnetic core semi-permanent memory comprising several lines and several columns, the interrogation windings of the cores in the state "one" of a single column (or of a single line), and only those, are placed in series with one another and with a resistance along an interrogation wire arranged in accordance with the said column (or the said line), the interrogation wires of the matrix are placed in parallel by groups in a group charge circuit including a supply source and a common capacitor, and there is provided a plurality of selective short circuiting means, that is, permitting the short circuiting of the common capacitor and the windings in series along a particular interrogation wire, to the exclusion of the windings in series along any other interrogation wire, so as to read only one column of the matrix. Thus, while the reading function is exercised only temporarily and selectively, the reinscription function is continuous, but is actually effective on only those cores which have just been read.

In the case of a magnetic core temporary memory comprising several lines and several columns, where it is necessary to provide for either reinscription or a new inscription, the interrogation windings of all of the cores of a single column (or of a single line), whether in the state "zero" or in the state "one" are placed in series with one another and with a resistance along an interrogation wire arranged in accordance with the said column (or the said line), the interrogation wires of the matrix are likewise placed in parallel by groups in a group charge circuit including a supply source and a common capacitor, and there is provided a plurality of selective short circuiting means, that is, permitting the discharge of the capacitor of a group through the windings in series along a particular interrogation wire. But here, the value of the load resistances located in each interrogation wire is sufficiently high so that the charging current alone will not be enough to effect the reinscription or a new inscription. There is a supplemental winding on each core which is also traversed by a complementary current when there is occasion to reinscribe the digit "one" after a reading, or to inscribe the digit "one" in a core where the digit "zero" had been previously inscribed.

It is known (see the article by M. Karnaugh entitled "Pulse Switching Circuits Using Magnetic Cores" which appeared in the American Review "Proceedings of the I.R.E.," volume 43, May 1955, No. 5, pages 570–584), that the inverse of the switching time of a core is a linear function of the current that circulates in the control winding of the core. Since in general, for operating reasons, there is more time available for reinscribing in a memory than for reading (in particular we have available for the reinscription, the time during which the units following the memory are making use of the word which has just been read), it is desirable to make the reading time shorter than the reinscription time, and in consequence, that the discharge current of the capacitor for the reading be greater than the charging current for the reinscription. Now, since the discharge of the capacitor through the interrogation winding takes place in a short circuit, that is, without the insertion of any resistance in the discharge circuit, whereas the charging of the capacitor through the interrogation winding takes place with the insertion of a resistance in the charging circuit, the discharge current is greater than the charge current, and we find ourselves in the desired position. Furthermore, since the reinscription follows immediately after the reading, without it being necessary to initiate it by any particular signal, no time is lost between the reading and the reinscription, and the device lends itself to high speeds of operation.

The invention will now be described in detail, with reference to the accompanying drawings, in which.

Figure 1:
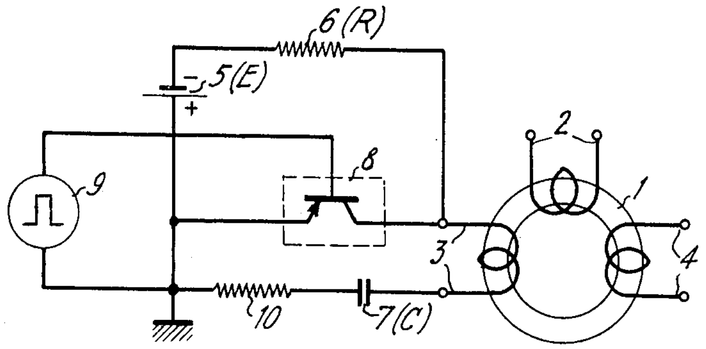
FIG. 1 shows the reading and reinscription device of the invention, in the case of a single core.

FIG. 1 represents the reading and reinscription device in the case of a single magnetic core. The numeral 1 designates the magnetic core, 2 a write winding which may be eliminated in the case where the core belongs to a semi-permanent memory, 3 and interrogation or test winding, and 4 a sense winding. The interrogation winding 3 is connected in series with a direct current source 5, a resistance 6, and a capacitor 7. A switch, which is shown in the form of a transistor 8, may be blocked or made conductive by an impulse generator 9, permitting the short circuiting of that part of the assembly formed by the interrogation winding 3 and the capacitor 7. The electromotive force of the current source 5 is designated by E, the value of the resistance 6 by R, the capacity of the capacitor 7 by C, and the number of turns of the winding 3 by $n$.

The core 1, being in a given state of saturation, passes into the opposite state of saturation if one of the windings, the winding 3 for example, is traversed in the proper direction by a current of intensity I greater than $i_c$, the value $i_c$ being given by the relation:

$$i_c=\frac{10}{4\pi}\frac{l}{n}H_c$$

where $l$ is the average length of the core 1, equal to $\pi$ times its diameter, and $H_c$ is the coercive field of the magnetic material constituting the core.

During the reinscription time, the transistor 8 is blocked, and the capacitor 7 charges under the voltage E, through the winding 3 and the resistance 6. If $\tau_1$ designates the switching time of the core during the charging, we have:

$$E\tau_1=RCE+\frac{1}{C}\int_0^{\tau_1}qdt+2nB_rS \quad (1)$$

where $q(t)$ designates the quantity of electricity transported by the circuit as a function of time, $B_r$ the remanent induction, and S the cross sectional area of the core.

During the read time, the transistor 8 is conductive, and the capacitor 7 discharges through the winding 3. If $\tau_2$ designates the switching time of the core during the discharge, we have:

$$\frac{1}{C}\int_0^{\tau_2}qdt=2nB_rS \quad (2)$$

By combining the Relations 1 and 2, we obtain a relation in the form:

$$\tau_1=RC+\frac{K}{Q} \quad (3)$$

by calling Q the quantity of electricity stored in the capacitor 7, and K a constant.

The resistance 10 of the FIG. 1 in series with the capacitor 7 permits the measurement of the discharge current, and if it is sufficiently small, it does not disturb the operation appreciably.

Figure 2:
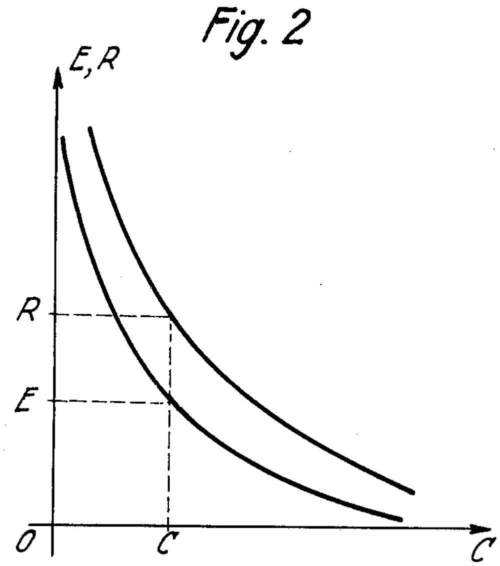
FIG. 2 shows curves indicating the voltage of the charging source and the resistance of the charging circuit as a function of the capacity of the capacitor of the device.

FIG. 2 shows a first hyperbole representing the variation of E as a function of C according to the relation:

$$E=Q\frac{1}{C} \quad (4)$$

and a second hyperbole representing the variation of R as a function of C according to the relation:

$$R=\left(\tau_1-\frac{K}{Q}\right)\frac{1}{C} \quad (5)$$

The slope of these curves is confirmed by experience.

By way of an example of construction, in a circuit built by the applicant, the electrical characteristics of the components are the following:

| | |
|---|---|
| Core **1** | Type RCA–XF–4008T. |
| Interrogation winding **3** | 2 turns. |
| Sense winding **4** | 5 turns. |
| Transistor **8** | Type 2N 396 Thomson. |
| Resistance **6** | 180 ohms. |
| Resistance **10** | 10 ohms. |
| Capacitor **7** | 3,300 picofarads. |
| Source **5** | 12 volts. |
| $\tau_1$=1 microsecond | |
| $\tau_2$=0.3 microsecond | |
| Rate of operation | 400 kilocycles per second. |

Figure 3:
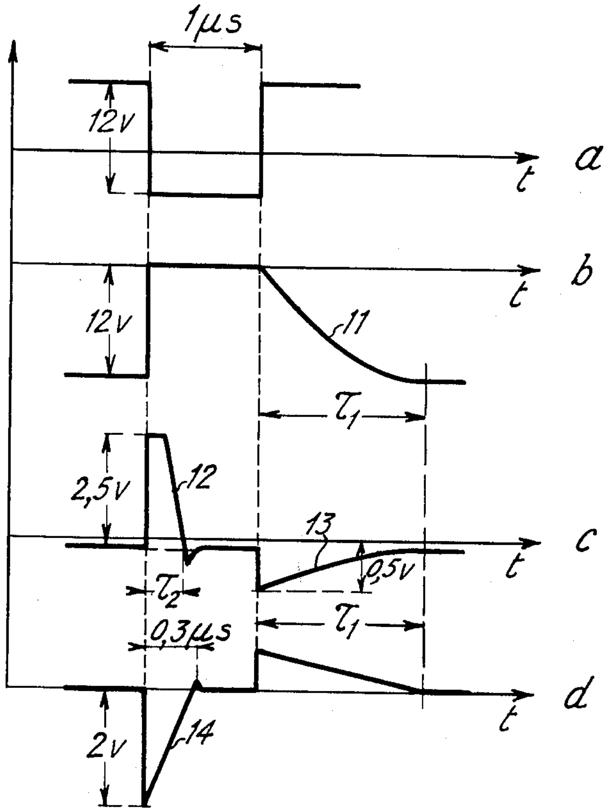
FIG. 3 shows the wave form of the signals at different points in the circuits of the device of FIG. 1.

The diagram of the wave form of the signals at different points of the circuit, represented by the FIG. 3, permits the understanding of its operation.

Line $a$ represents the form of the impulse produced by the generator 9 for the unblocking of the transistor 8. It is assumed that this impulse has a duration of one microsecond. Line $b$ represents the current in the transistor 8 obtained by measuring the voltage at the terminals of the resistance 6. The portion 11 of the signal corresponds to the charge of the capacitor 7. The line $c$ represents the current in the interrogation winding 3 obtained by measuring the voltage at the terminals of the resistance 10. The portion 12 of the signal corresponds to the discharge of the capacitor and thus to the reading, and the portion 13 to the charge and thus to the reinscription. The line $d$ represents the voltage impulse 14 at the terminals of the sense winding 4. In the specific example given above, the amplitude of this impulse is 2 volts, and its duration is 0.3 microsecond.

If we should interrogate the core 1 by utilizing only the source 5 and the resistance 6 in series with the winding 3, we would collect at the terminals of the sense winding 4, an impulse of an amplitude of 0.4 volt and of a duration of 0.75 micro-second.

Figure 4:
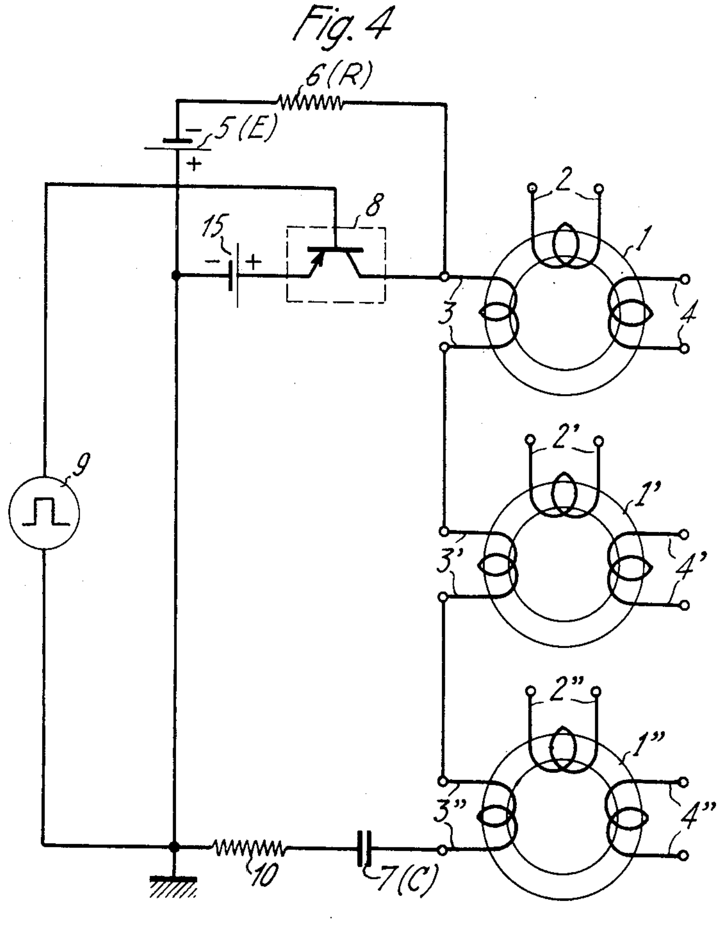
FIG. 4 represents the reading and reinscription device of the invention for the case of several cores forming the column of a matrix.

FIG. 4 represents the system for the reading and the reinscription of a plurality of magnetic cores 1, 1', 1''. The interrogation windings 3, 3', 3'' are connected in series in the portion common to the charging circuit and the discharge circuit of the capacitor 7. When the number of cores becomes important, the read signals at the terminals of the windings 4, 4', 4'' are weakened. It is sometimes necessary to reinforce the discharge effect by a direct current source 15 placed in the short circuit path containing the transistor, and polarized in the sense of the reinforcement.

Figure 5:
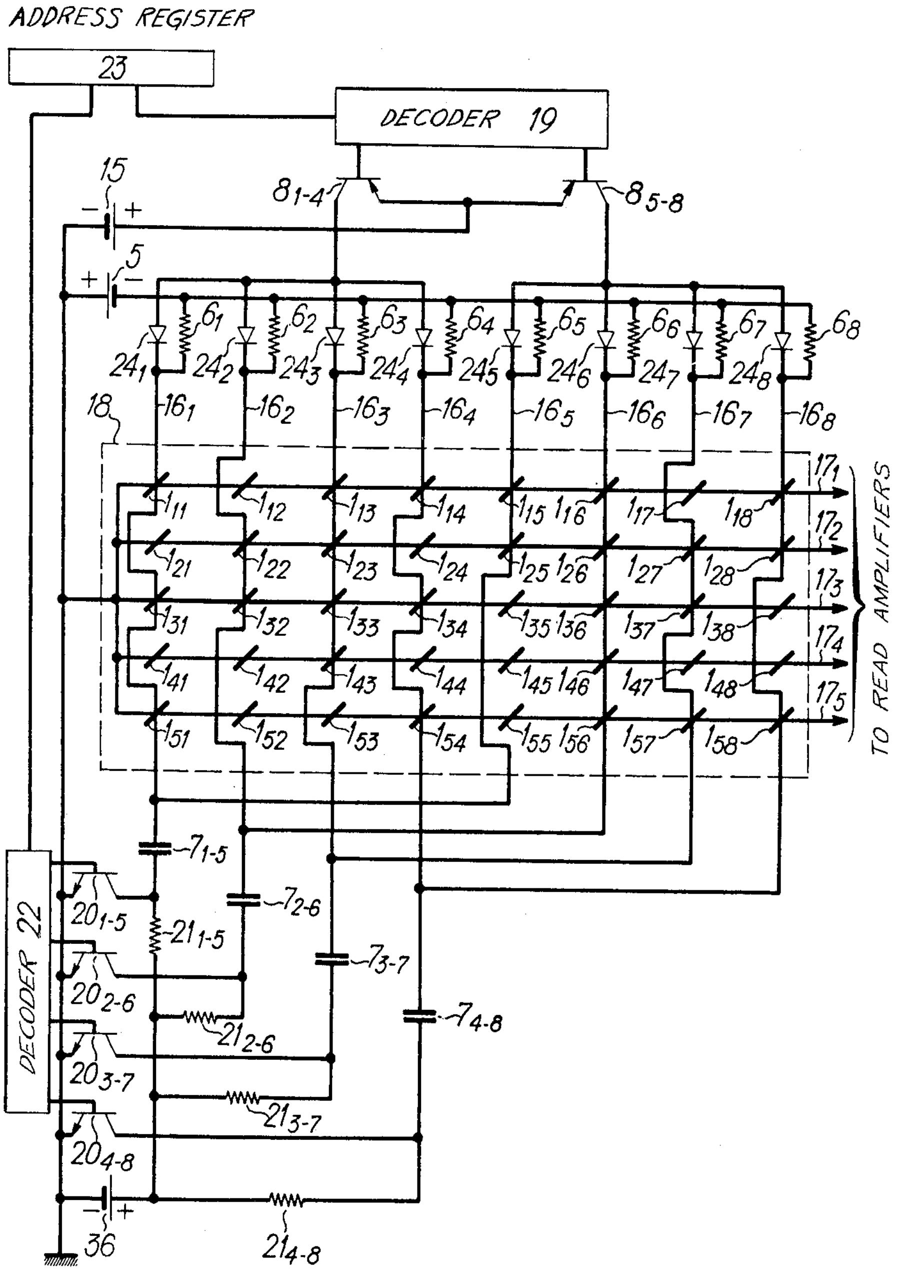
FIG. 5 represents a semi-permanent memory equipped with the reading and reinscription device of the invention.

FIG. 5 represents a magnetic core type semi-permanent memory incorporating the reading and reinscription device of the invention.

The cores are represented by oblique lines; they form a matrix 18 of five lines and eight columns, and are numbered in matrix numerotation from $\mathbf{1}_{11}$ to $\mathbf{1}_{58}$. There are eight interrogation wires $\mathbf{16}_1$ to $\mathbf{16}_8$, which are the column wires of the matrix, and wind around the cores of the semi-permanent memory which are in the state "one" (or more simply, pass through the openings of the corresponding cores). The interrogation wires are not wound around the cores of the semi-permanent memory that are in the state "zero" (or more simply, do not pass through the openings of the coresponding cores).

There are five sense wires $\mathbf{17}_1$ to $\mathbf{17}_5$, which are the line wires of the matrix.

Each interrogation wire is selected by means of two decoders 19 and 22, the first of which receives, from an address register 23, the address of a group of columns (there are two groups of four columns), and the second, the address of a column in the group. In each output of the decoders a transistor is inserted; these are respectively $\mathbf{8}_{1-4}$ and $\mathbf{8}_{5-8}$ for the decoder 19 and $\mathbf{20}_{1-5}$, $\mathbf{20}_{2-6}$, $\mathbf{20}_{3-7}$ and $\mathbf{20}_{4-8}$ for the decoder 22. Negative impulses appear on the output wires of the decoder 19, and positive impulses on the output wires of the decoder 22; these impulses unblock the transistors inserted in the said wires. Such an arrangement for a matrix employing magnetic cores, but not including the reading and reinscription device, is known in the prior art, and is described for example, in the article by W. Renwick entitled "A Magnetic Core Matrix Store With Direct Selection Using a Magnetic Core Switch Matrix," which appeared in the British Review "The Proceedings of the Institution of Electrical Engineers," volume 104, Part B, Supplement No. 7, 1957, pages 436 to 444.

In each interrogation wire $\mathbf{16}_1$–$\mathbf{16}_8$ a resistance is inserted; these are respectively $\mathbf{6}_1$–$\mathbf{6}_8$, which play the role of the resistance 6 of FIG. 1. In the interrogation wires $\mathbf{16}_1$ and $\mathbf{16}_5$ there is inserted a single capacitor $\mathbf{7}_{1-5}$, in the interrogation wires $\mathbf{16}_2$ and $\mathbf{16}_6$ a single capacitor $\mathbf{7}_{2-6}$, in the interrogation wires $\mathbf{16}_3$ and $\mathbf{16}_7$ a single capacitor $\mathbf{7}_{3-7}$, and in the interrogation wires $\mathbf{16}_4$ and $\mathbf{16}_8$ a single capacitor $\mathbf{7}_{4-8}$. The capacitors $\mathbf{7}_{1-5}$, $\mathbf{7}_{2-6}$, $\mathbf{7}_{3-7}$, $\mathbf{7}_{4-8}$ play the role of the capacitor 7 of FIG. 1. Finally, the resistances $\mathbf{21}_{1-5}$, $\mathbf{21}_{2-6}$, $\mathbf{21}_{3-7}$, $\mathbf{21}_{4-8}$ inserted in the interrogation wires taken two by two, play the role of the resistance 10 of FIG. 1 as to that which concerns the charge or reinscription circuit, on the one hand, and a role of selection and decoupling of the interrogation wire as to that which concerns the discharge or read circuit on the other hand.

The transistors $8_{1-4}$ and $8_{5-8}$ play the role of the transistor 8 of FIG. 1. But here they do not short circuit the discharge circuit corresponding to a single interrogation wire, but rather the discharge circuits corresponding to a group of four interrogation wires. It is therefore necessary that the discharge circuit of a given capacitor serving for the reading of the cores located on a particular interrogation wire be the object of a second selection; this is the role of the transistors $20_{1-5}$, $20_{2-6}$, $20_{3-7}$, $20_{4-8}$, which are inserted in the discharge circuits. The charge circuits of the capacitors pass through the resistances $21_{1-5}$, $21_{2-6}$, $21_{3-7}$, $21_{4-8}$, and these resistances serve in addition for the decoupling of the discharge circuits. Actually, if the transistors $8_{1-4}$ and $20_{1-5}$ are passing, the discharge circuit of the interrogation wire $16_1$ includes only the windings inserted in this wire, the capacitor $7_{1-5}$ and the two preceding transistors, whereas the discharge circuit of the interrogation wire $16_2$ for example, includes the windings inserted in the said wire, the capacitor $7_{2-6}$, the two preceding transistors, and in addition, the resistances $21_{2-6}$ and $21_{1-5}$.

The discharge of a capacitor such as $7_{1-5}$ is capable of taking several paths: the transistors $8_{1-4}$ and $20_{1-5}$ and the wire $16_1$, or else these same two transistors and the wire $16_5$ in the upward direction, $16_6$ in the downward direction and $16_2$ in the upward direction, or again these same two transistors and the wires $16_5$ in the upward direction, $16_7$ in the downward direction and $16_3$ in the upward direction, or finally, these same two transistors and the wires $16_5$ in the upward direction, $16_8$ in the downward direction and $16_4$ in the upward direction. The diodes $24_1$ and $24_8$ serve to prevent the circulation of these parasite read currents.

The current sources 5 and 15 play the same role as the sources of the same reference numbers in FIG. 4, that is to say, a role of charging the capacitors, or of reinscription, and a role of reinforcing the discharge current, or of reading, and in addition they serve for the polarizing and feeding of the transistors $8_{1-4}$ and $8_{5-8}$. The source 36, which has no equivalent in FIG. 4, serves for the feeding of the transistors $20_{1-5}$, $20_{2-6}$, $20_{3-7}$, $20_{4-8}$.

Figure 6:
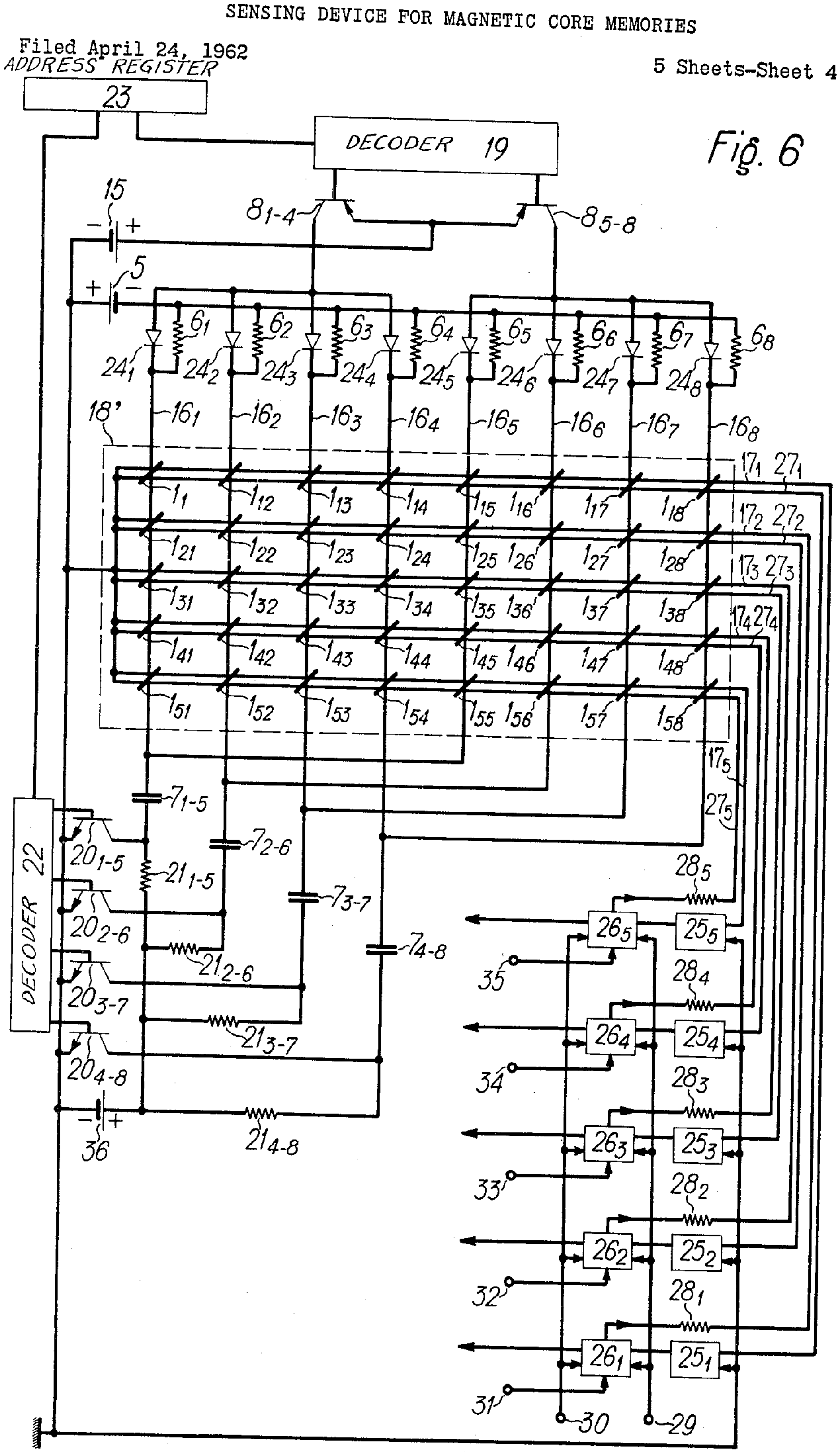
FIG. 6 represents a temporary memory equipped with the reading and reinscription device of the invention.

The FIG. 6 represents a memory which is no longer semi-permanent but temporary. The reference numbers of the FIG. 6 are in part the same as those of FIG. 5, when they designate the same elements.

The interrogation wires $16_1$ to $16_8$ now traverse all of the cores of the corresponding column. The resistances $6_1$ to $6_8$ have an appropriate value which is greater than in the case of the FIG. 5, in order that the charging current of the capacitors will be insufficient of itself to cause the reinscription. Each line of the matrix 18' includes two line wires, one of which is the sense wire, respectively $17_1$ to $17_5$, and the other of which is the reinscription wire, respectively $27_1$ to $27_5$. The sense wires terminate at the inputs of sense amplifiers, respectively $25_1$ to $25_5$, which were not represented in FIG. 5. To the output of the sense amplifiers are connected coincidence circuits $26_1$ to $26_5$, whose outputs are connected respectively to the reinscription wires $27_1$ to $27_5$, through resistances $28_1$ to $28_5$.

The coincidence circuits $26_1$ to $26_5$ each have two general inputs connected to the control terminals 29 and 30, and one individual input connected respectively to the terminals 31 to 35. The terminal 29 is the reinscription control terminal. The terminal 30 is the terminal for the inscription of new information. Finally, the terminals 31 to 35 determine on which of the lines of the matrix 18' the inscription of the new information is to be made, it being understood that the new inscription is made in the column which is being read.

In the case of a reinscription, a signal is applied to the general reinscription terminal 29, which has the effect of placing all of the coincidence circuits $26_1$ to $26_5$ in the state where they send back, over the reinscription wires $27_1$ to $27_5$, the impulses arriving over the sense wires $17_1$ to $17_5$. If the digit read on the sense wire $17_1$ for example is a "one," a current is sent back over the reinscription wire $27_1$ by the coincidence circuit $26_1$. The superposition of the field created by the charge current circulating in the wire $16_1$ and of the field created by the reinscription current circulating in the wire $27_1$, returns the core $1_{11}$ to the state "one." If the digit read on the sense wire $17_1$ is a "zero," no current is sent back over the reinscription wire, and the charge current in the wire $16_1$ being insufficient of itself to cause a switching, the "zero" state is maintained.

In the case of the inscription of new information, the operation is as follows. If it is assumed that we wish to write the digit "zero" in the core $1_{11}$, which then contains the digit "one," a signal is applied in all cases to the inscription-change general terminal 30 on the one hand, and on the other hand, if necessary, to the individual terminal 31 associated with the coincidence circuit $26_1$ corresponding to the line wire $27_1$ which passes through the core $1_{11}$. The signal applied to the terminal 30 has the effect of preventing the return of the signal arriving on the wire $17_1$ back over the wire $27_1$. The result of this is that the new inscription will not depend on the old one which has just been read. If the new digit to be inscribed is a "one," a signal is applied to the terminal 31, which causes the transmittal of a current over the wire $27_1$. This current, adding its effect to that of the reinscription current, causes the writing of a "one" in the core $1_{11}$. If the new digit to be written were a "zero," no signal would be applied to the terminal 31.

Figure 7:
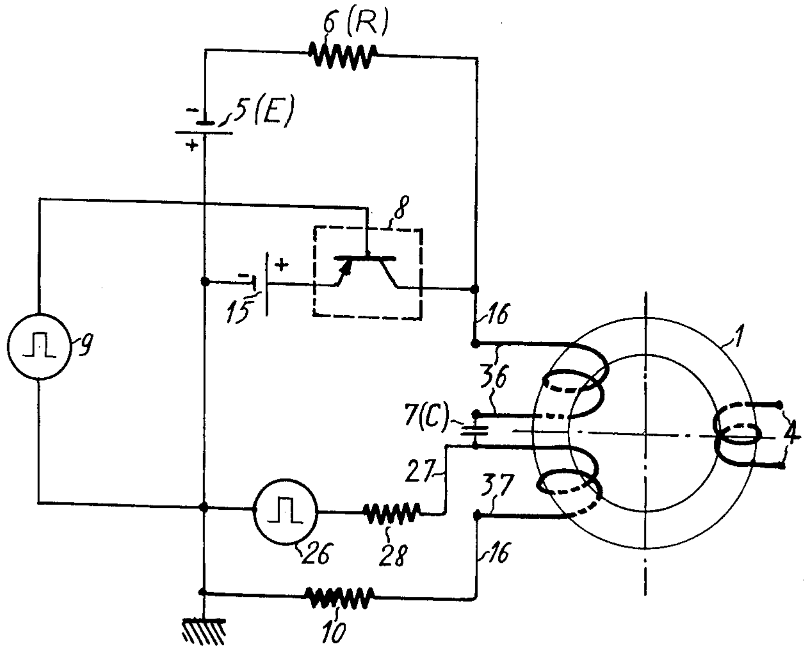
FIG. 7 is a variant of the arrangement of FIG. 1.

FIG. 7 represents a reading and reinscription device which is a variant of that of FIGS. 1 and 4, for the case where the core 1 serves for the construction of a temporary memory. With reference to FIG. 4, the changes are as follows. The interrogation winding includes two half-windings 36 and 37, and one of these half windings, designated 37, is also the inscription winding. The capacitor 7 is inserted between the two half windings. The circuit of the inscription winding includes a generator 26 and a resistance 28. When the generator 26 is not producing, the operation of the device is the same as that of FIG. 4; however, the resistance 6 has too high a value to permit the charge current of the capacitor 7 to be adequate to cause reinscription. The magnetic field produced by the current from the source 26 is therefore added to the charge current of the condenser 7 to cause the switching of the core.

Although the invention has been described on the basis of certain specific examples, it will be understood that variants easily imaginable to one skilled in the art are possible. In particular, when there have been provided, in FIG. 5, as many columns as there are words to be interrogated, it is possible to have all of the interrogation wires pass through the cores of the same column, since only one column is interrogated at any given moment. We are then limited by the number of interrogation windings that it is possible to place on the same core.

What I claim is:

1. A temporary memory device comprising:
a magnetic core having a rectangular hysteresis characteristic and capable of being switched from one magnetic remanent state to another;
an interrogation winding inductively coupled to said core to effect magnetic state switching;
capacitance means connected to said interrogation winding;
a source of direct current serially connected to said capacitance means and to said interrogation winding to charge said capacitance means via said interrogation winding and drive said core in the direction of a first remanent state;

means coupled to said core for complementing the action of said interrogation winding to place said core in said first remanent state;

a source of unipolar pulses, and amplifier switch means having an input connected to said pulse source and an output connected in shunt relation between said capacitance means and said source of direct current, said amplifier switch means being operated in response to a pulse from said source and said output being effective during said pulse to discharge said capacitance means via said interrogation winding to switch said core to a second remanent state; and a sense winding inductively coupled to said core to sense flux changes therein.

2. The magnetic memory device according to claim 1, and comprising resistance means serially interposed between said source of direct current and said capacitance means, to provide a charging time constant, and wherein said amplifier switch means is further connected in shunt relation to said source of direct current and a portion of said resistance means, whereby the operation of said switch means effectively shorts out said portion of said resistance means and provides a discharge time constant that is substantially shorter than the charging time constant.

3. A semipermanent magnetic memory comprising:

a plurality of magnetic cores, each said core having a rectangular hysteresis characteristic;

an interrogation conductor selectively linking predetermined ones of said cores;

capacitance means connected to said interrogation conductor;

a source of direct current connected to said interrogation conductor and to said capacitance means to charge said capacitance means via said interrogation conductor in a direction corresponding to a first magnetic remanent state of said cores and condition said predetermined ones of said cores to said first remanent state;

means including a source of pulses and amplifier switch means operated by a pulse and having an output connected in shunt relation to said direct current source for discharging for a predetermined interval said capacitance means via said interrogation conductor in a direction that is opposite to said first remanent state to switch said predetermined ones of said cores to a second remanent state; and a plurality of sense conductors, each of said sense conductors being individually inductively coupled to a corresponding core to sense magnetic flux changes therein.

4. The semipermanent memory according to claim 3, wherein said means to discharge said capacitance means further includes a second source of direct current coupled to said capacitance means in a polarity sense to aid the discharge.

5. A semipermanent magnetic memory comprising:

a plurality of magnetic cores arranged in an array of columns and lines, each said core having a rectangular hysteresis characteristic, some of said cores normally in a first remanent state storing one binary number, and others of said cores in a second remanent state storing the other binary number;

a plurality of interrogation conductors individually associated with said columns and inductively linking corresponding ones of said cores which are in a first remanent state;

a plurality of capacitance means connected to said interrogation conductors;

a source of direct current connected to said interrogation conductors and to said capacitance means, said plurality of capacitance means thereby being charged via said interrogation conductor in a direction corresponding to the first remanent state of said corresponding inductively linked cores;

means to selectively discharge for a predetermined interval, said plurality of capacitance means via their corresponding interrogation conductors in a direction that is opposite to the first remanent state to switch the correspondingly linked cores to the second remanent state; and a plurality of sense conductors, each of said sense conductors being individually inductively coupled to the cores of the associated line to sense magnetic flux changes therein.

6. A temporary magnetic memory comprising:

a magnetic core having a rectangular hysteresis characteristic, said core being normally in a first magnetic remanent state and capable of being switched from one magnetic remanent state to another;

an interrogation conductor inductively linked to said core;

a source of direct current connected to said interrogation conductor;

capacitance means connected to said interrogation conductor and to said source of direct current, said capacitance means being charged thereby via said interrogation conductor, the charging current being insufficient to effect a magnetic state reversal of said core;

means to discharge said capacitance means via said interrogation conductor, the discharging current being effective to reverse the magnetic remanent state of said core to a second magnetic remanent state;

a sense conductor inductively linked to said core to sense flux changes;

a third conductor inductively coupled to said core;

and means connected to said third conductor and operated to transmit a complementary signal along said third conductor in coincidence with the charging current of said capacitance means traversing said interrogation conductor to reswitch said core to said first remanent state.

7. A temporary magnetic memory comprising:

a plurality of magnetic cores arranged in an array of columns and lines, each said core having a rectangular hysteresis characteristic, some of said cores being normally in a first magnetic remanent state and others of said cores being normally in a second magnetic remanent state;

a plurality of interrogation conductors, each of said interrogation conductors being associated with a separate column and inductively linked to the magnetic cores of that column;

a source of direct current connected to said plurality of interrogation conductors;

a plurality of capacitance means connected to said interrogation conductor and to said source of direct current, said capacitance means being charged thereby via said interrogation conductors, the charging current being insufficient to effect magnetic state reversals of said cores;

means to selectively discharge said plurality capacitance means for a predetermined time interval via their corresponding selected interrogation conductors, the discharging current being effective to reverse the magnetic remanent state of said cores which are normally in said second magnetic remanent state;

a plurality of sense conductors, each of said second conductors being associated with a separate line and inductively linked to the corresponding cores to sense flux changes as voltage signals;

a plurality of third conductors, each of said third conductors being associated with a separate line and inductively coupled to the corresponding magnetic cores; and means connecting said sense conductors and corresponding third conductors and operated to selectively generate and transmit a complementary signal along said third conductors in coincidence with the charging current of said capacitance means to reswitch the interrogated cores back to the second magnetic remanent state and thereby reinscribe the interrogated information therein.

8. The temporary memory according to claim 7, wherein the last-mentioned means comprises a plurality of gate means, each gate means being individually connected to a separate one of said third conductors and each including:

a first control input adapted to receive a first control signal, said gate means being responsive to the first control signal to effect transmission of a complementary signal along the corresponding third conductor when a voltage signal is sensed from a core normally in a first remanent state to restore the information read;

a second control input adapted to receive a second control signal, said gate means being responsive to the second control signal to inhibit the transmission of a complementary signal when a signal is sensed from a core normally in a second remanent state to maintain such cores in a second remanent state; and a third control input adapted to receive a third control signal, said gate means being responsive to the third control signal to effect transmission of a complementary signal along the corresponding third conductor when a signal is sensed from a core normally in the second remanent state to change the normal information storage of such cores to the first remanent state.

9. A magnetic memory device comprising:

a magnetic core having a rectangular hysteresis characteristic and capable of being placed in first and second magnetic remanent states;

first and second windings inductively coupled to said core in like signal transfer relationship;

capacitance means serially interposed between said first and second windings;

a charging path for said capacitance means including a direct current source connected to the serially connected windings and capacitance means, the charging current through said windings being insufficient to switch the magnetic state of said core;

a complementary current path including a direct current generator connected to one of said two windings, the supplemental current and the charging current being sufficient to place said core in said first remanent state;

a discharge path for said capacitance means including switch means connected in shunt relation to the serially connected windings and capacitance means;

switch control means to enable said switch means for a predetermined time interval, the discharge current being sufficient to switch said core from said first remanent state to a second remanent state, the complementary and charging currents thereafter being effective to reswitch said core to said first remanent state; and third winding means inductively coupled to said core to sense flux changes therein as voltage signals.

10. The magnetic memory device according to claim 9, wherein said switch means includes a transistor having first and second electrodes connected in shunt relation to said source of direct current and a third electrode, and wherein said switch control means includes a pulse generator having an output connected to said third electrode.

11. The magnetic memory device according to claim 9, comprising a second source of direct current serially interposed in said discharge path in a direction to aid the discharge.

12. The magnetic memory device according to claim 9, comprising resistance means serially interposed in said discharge path and a substantially greater resistance means serially interposed in said charge path, whereby the charging time constant of said capacitance means is substantially greater than the discharge time constant.

References Cited by the Examiner

UNITED STATES PATENTS

| | | | |
|---|---|---|---|
| 3,041,467 | 6/62 | Auerbach | 307—88 |

OTHER REFERENCES

Pages 436—444, 1957, Publication I: Proceedings of the Institute of Electrical Engineers, vol. 104, Part B, Supplement No. 7.

IRVING L. SRAGOW, *Primary Examiner.*